(12) United States Patent
Gadawski

(10) Patent No.: US 8,940,423 B2
(45) Date of Patent: Jan. 27, 2015

(54) VEHICLE BATTERY PACK CONTAINER

(75) Inventor: Thomas J. Gadawski, Shelby Township, MI (US)

(73) Assignee: LG Chem, Ltd., Seoul (KR)

( * ) Notice: Subject to any disclaimer, the term of this patent is extended or adjusted under 35 U.S.C. 154(b) by 365 days.

(21) Appl. No.: 13/327,124

(22) Filed: Dec. 15, 2011

(65) Prior Publication Data
US 2013/0157091 A1 Jun. 20, 2013

(51) Int. Cl.
*H01M 2/10* (2006.01)
*H01M 2/12* (2006.01)

(52) U.S. Cl.
USPC .............................. 429/82; 429/100; 429/159

(58) Field of Classification Search
None
See application file for complete search history.

(56) References Cited

U.S. PATENT DOCUMENTS

| | | | |
|---|---|---|---|
| 5,639,571 A | 6/1997 | Waters et al. | |
| 2005/0170241 A1* | 8/2005 | German et al. | 429/120 |
| 2011/0135978 A1* | 6/2011 | Wiegmann et al. | 429/82 |
| 2014/0087219 A1 | 3/2014 | Merriman et al. | |

FOREIGN PATENT DOCUMENTS

| | | | |
|---|---|---|---|
| JP | 2004-243855 | * | 9/2004 |
| KR | 20050050630 A | | 5/2005 |
| KR | 20070103890 A | | 10/2007 |
| KR | 20090124110 A | | 12/2009 |
| KR | 1020100106060 | * | 1/2010 |

OTHER PUBLICATIONS

International Search Report for International application No. PCT/KR2012/010086 dated Mar. 4, 2013.

* cited by examiner

*Primary Examiner* — Jonathan Crepeau
(74) *Attorney, Agent, or Firm* — Buckert Patent & Trademark Law Firm, P.C.; John F. Buckert

(57) ABSTRACT

A vehicle battery pack container is provided. The container includes a base portion having an aperture extending therethrough, a peripheral wall coupled to the base portion, and a cover coupled to the peripheral wall. The container further includes a venting device having a housing and a ball disposed within an interior region of the housing. The housing is coupled to the base portion such that the venting device is in fluid communication with the aperture in the base portion. The ball seals against a sealing tab of the housing at a first operational position to prevent fluids from passing through the venting device into the container. The ball allows gases from the container to flow through the venting device when the ball is at a second operational position.

9 Claims, 6 Drawing Sheets

VEHICLE BATTERY PACK CONTAINER

BACKGROUND

The inventors herein have recognized a need for an improved vehicle battery pack container configured to vent gases from a vehicle battery pack.

SUMMARY

A vehicle battery pack container in accordance with an exemplary embodiment is provided. The vehicle battery pack container includes a base portion having an aperture extending therethrough, a peripheral wall coupled to the base portion, and a cover coupled to the peripheral wall. The vehicle battery pack container further includes a venting device having a housing and a ball disposed within an interior region of the housing. The housing is configured to be coupled to the base portion such that the venting device is in fluid communication with the aperture in the base portion. The ball is configured to move within the interior region of the housing between a first operational position and a second operational position. The ball is further configured to seal against a sealing tab of the housing at the first operational position to prevent fluids from passing through the venting device into an interior region of the vehicle battery pack container. The ball is further configured to allow gases from the interior region of the vehicle battery pack container to flow through the venting device when the ball is at the second operational position.

DETAILED DESCRIPTION

Figure 1:
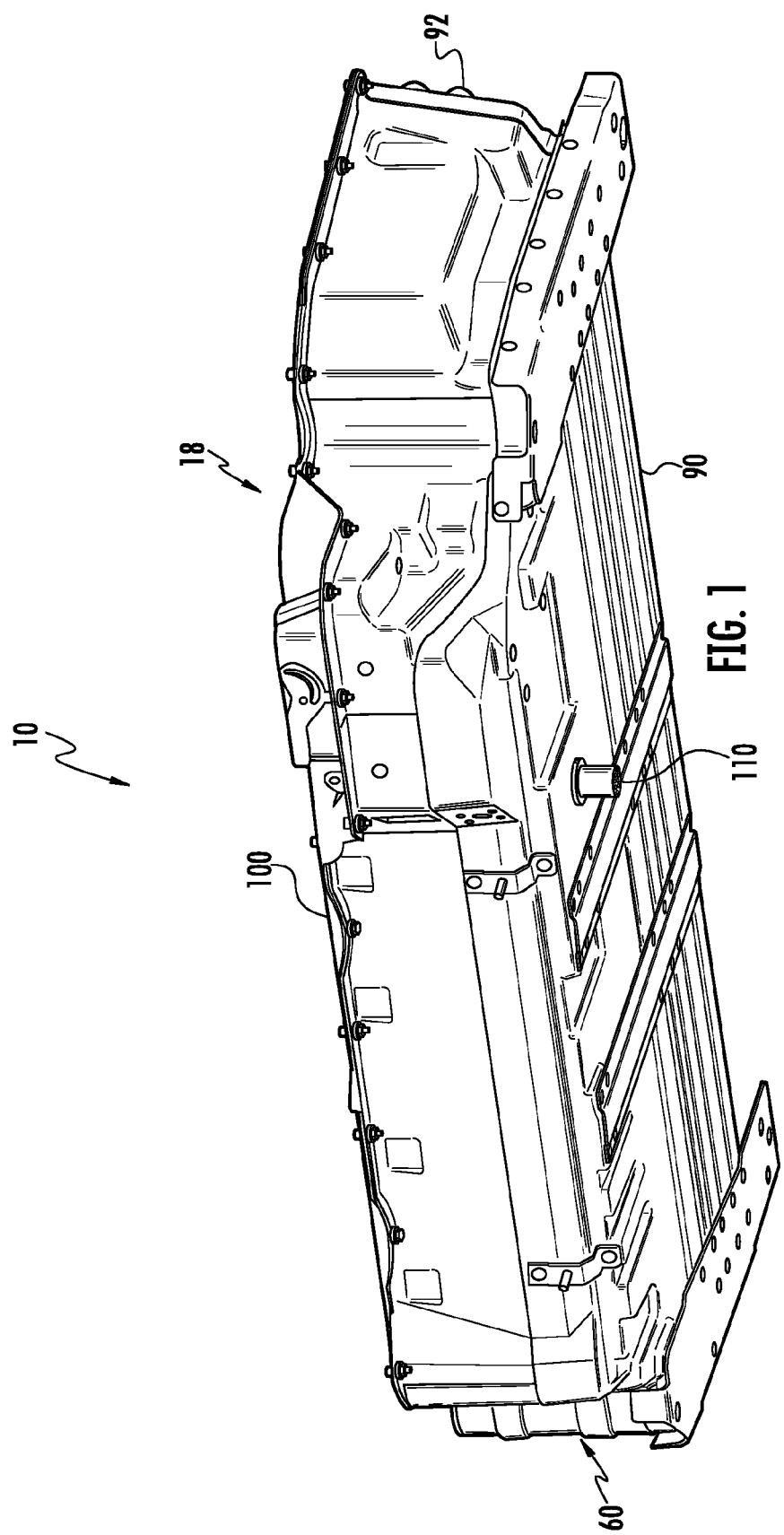
FIG. 1 is a schematic of a vehicle battery pack having a vehicle battery pack container in accordance with an exemplary embodiment.
Figure 2:
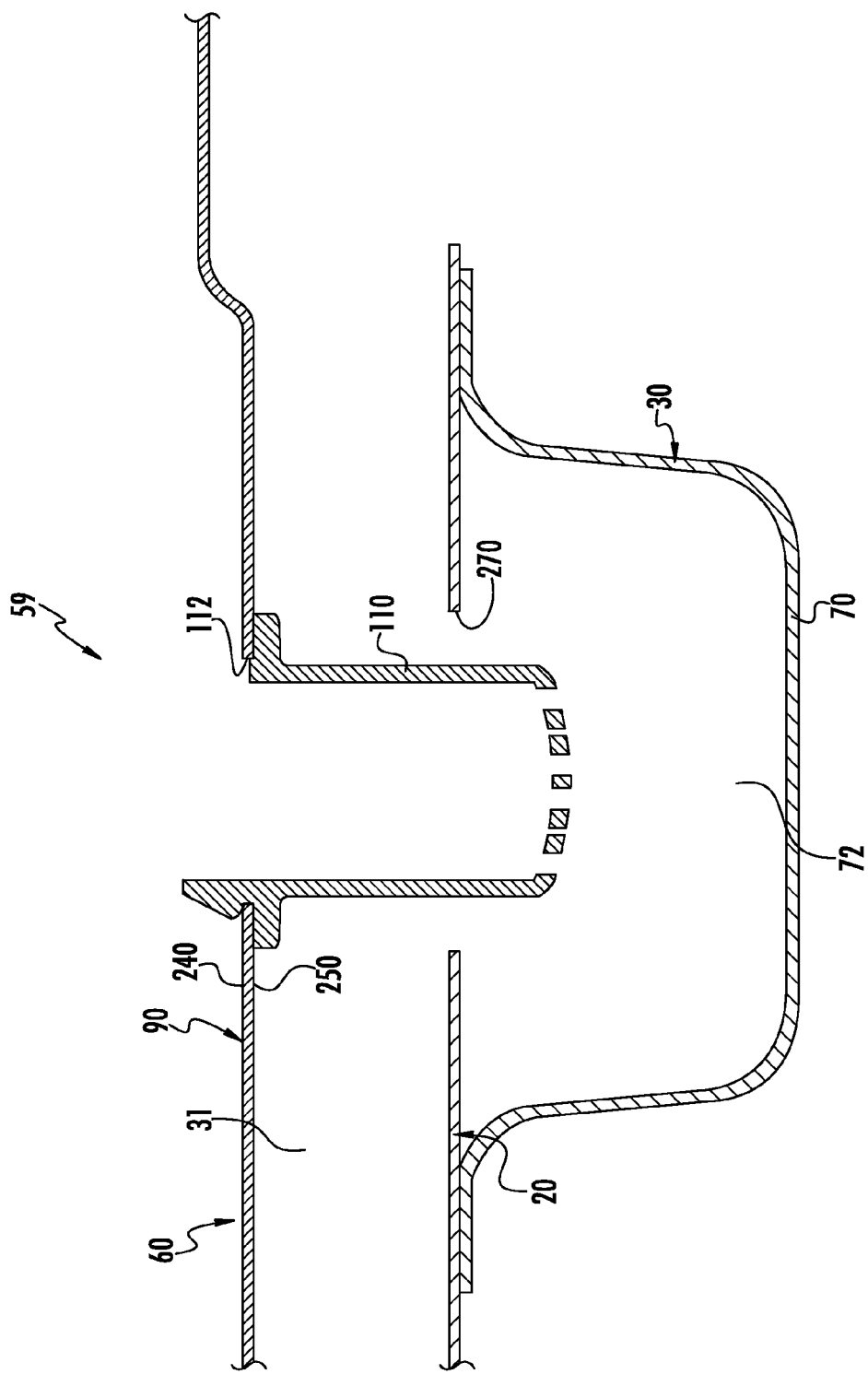
FIG. 2 is a cross-sectional schematic of a portion of a vehicle illustrating a portion of the vehicle battery pack container of FIG. 1 and a portion of a vehicle frame.
Figure 3:
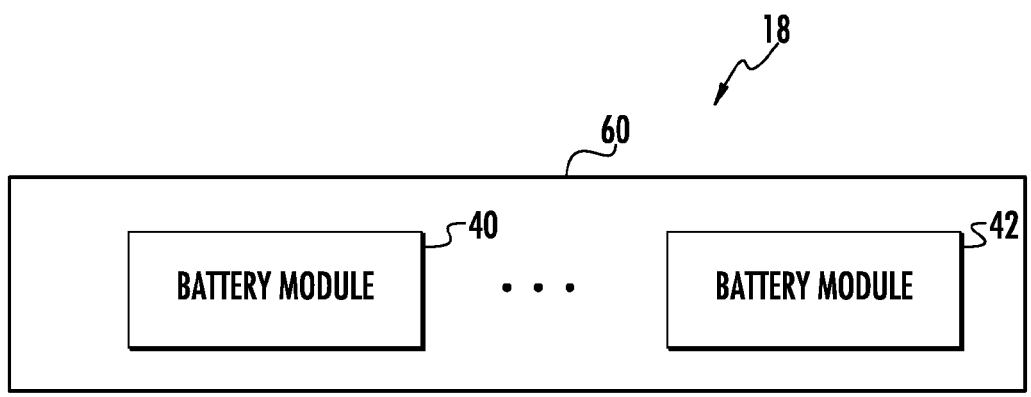
FIG. 3 is a block diagram of the vehicle battery pack of FIG. 1 having battery modules and the vehicle battery pack container.

Referring to FIGS. 1-3, a vehicle 10 having a vehicle battery pack 18 is provided. The vehicle 10 further includes a vehicle floor 20, a vehicle frame 30, and a foam gasket 31. The vehicle battery pack 18 includes battery modules 40, 42 and a vehicle battery pack container 60 in accordance with an exemplary embodiment. The vehicle battery pack container 60 holds the battery modules 40, 42 therein. As shown, the vehicle battery pack container 60 is disposed on a foam gasket 31 which is further disposed on the vehicle floor 20. The vehicle floor 20 is coupled to the vehicle frame 30. The vehicle frame 30 includes a vehicle frame member 70 that defines a region 72 which receives a portion of the venting device 110 therein.

The vehicle battery pack container 60 is provided to support and enclose the battery modules 40, 42 therein and to safely vent gases from an interior region 59 of the vehicle battery pack container 60 to the region 72 which communicates with ambient atmosphere. The vehicle battery pack container 60 includes a base portion 90, a peripheral side wall 92, a cover 100, and a venting device 110. The base portion 90 includes an aperture 112 (shown in FIG. 2) extending therethrough. The peripheral side wall 92 is coupled to an outer periphery of the base portion 90. The battery modules 40, 42 are disposed on the base portion 90. The cover 100 is disposed on a top portion of the peripheral side wall 92 to enclose the battery modules 40, 42 within the region 59 of the vehicle battery pack container 60. In one exemplary embodiment, the base portion 90 and the peripheral side wall 92 are constructed of steel, and the cover 100 is constructed of plastic. In an alternative embodiment, the base portion 90, the peripheral side wall 92, and the cover 100 could be constructed of other materials known to those skilled in the art.

Figure 4:
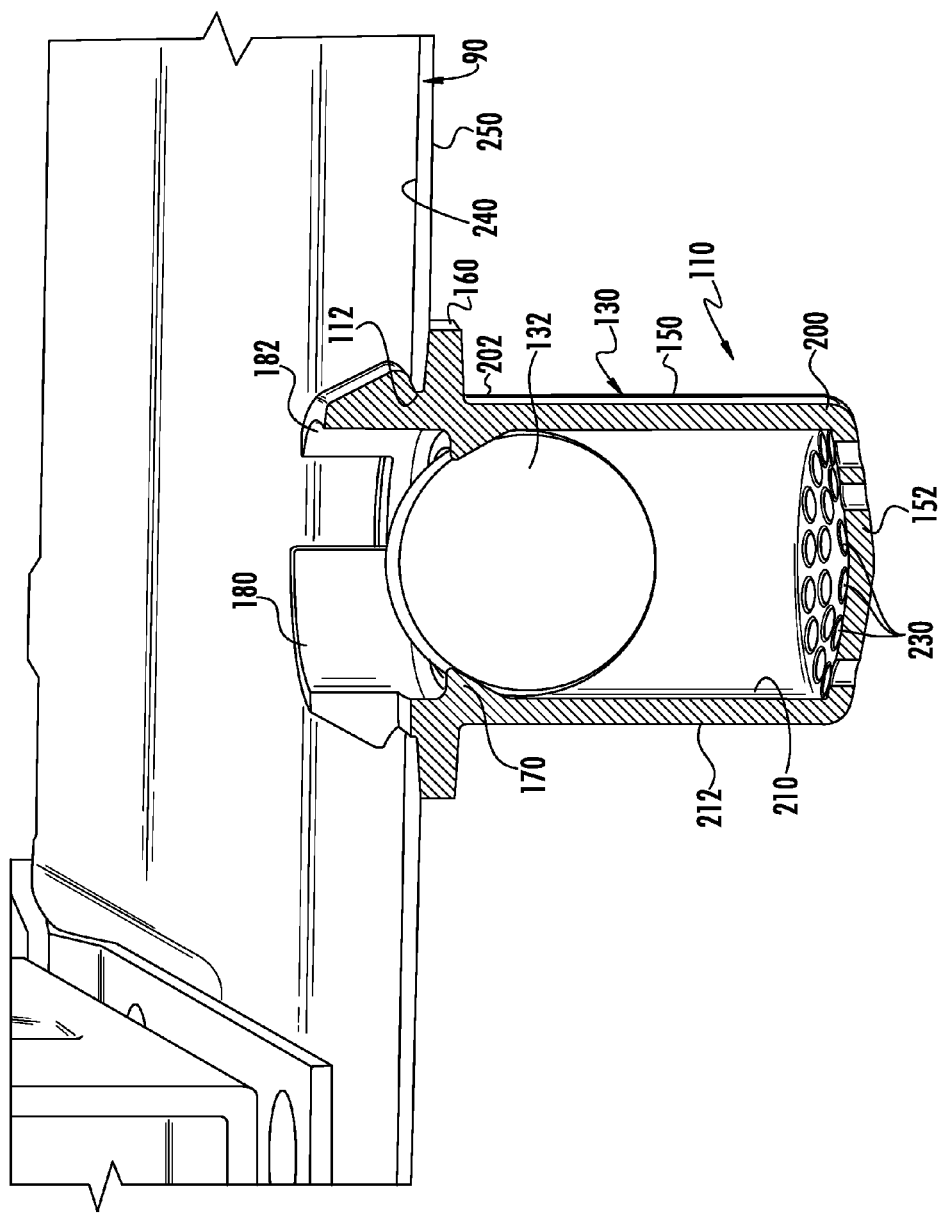
FIG. 4 is a cross-sectional schematic of a venting device coupled to a base portion of a vehicle battery pack container wherein the venting device has a ball at a first operational position.
Figure 5:
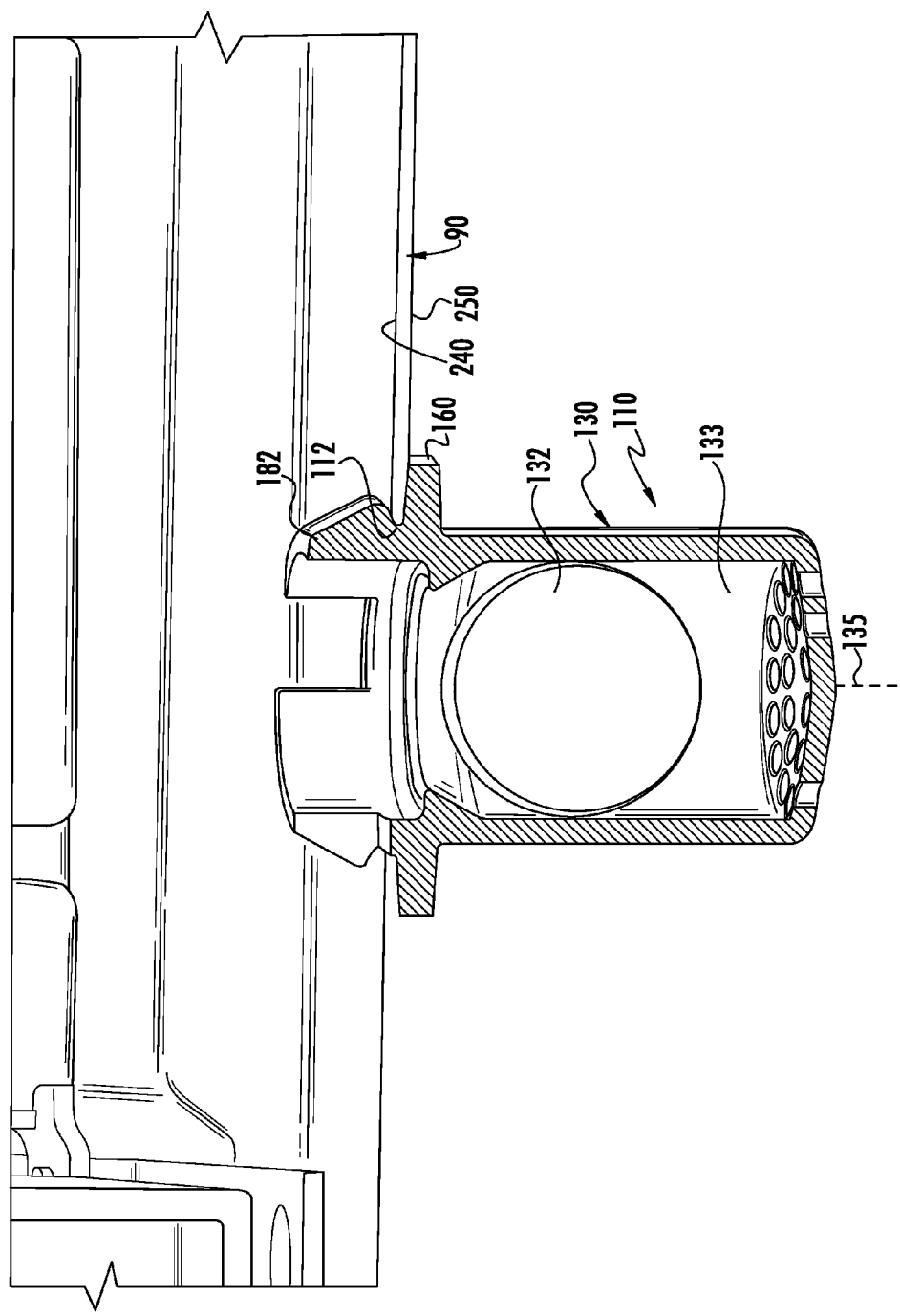
FIG. 5 is another cross-sectional schematic of the venting device of FIG. 4 wherein the venting device has a ball at a second operational position.
Figure 6:
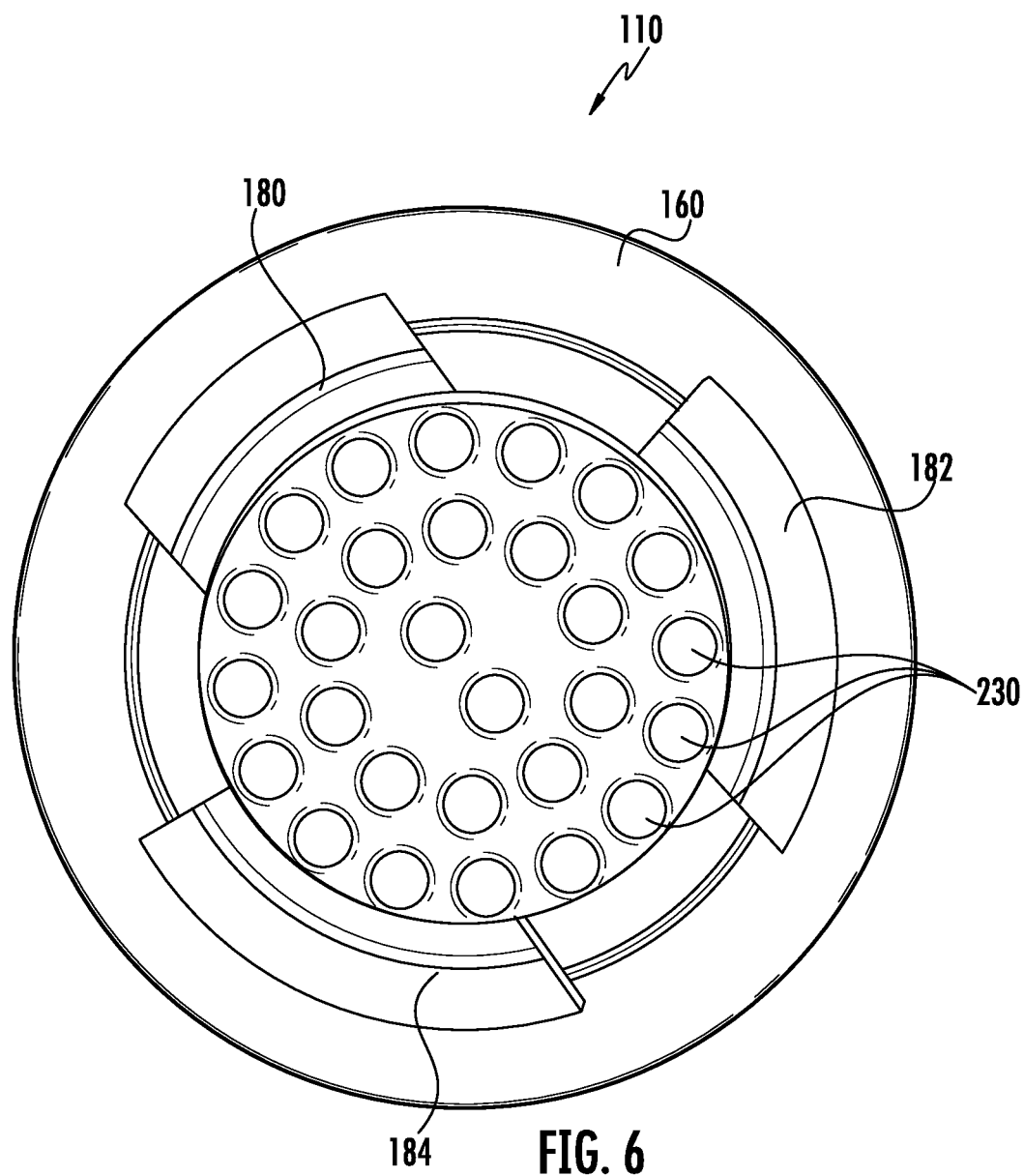
FIG. 6 is a top view of the venting device of FIG. 4.

Referring to FIGS. 2, 4 and 5, the venting device 110 is provided to safely vent gases from the interior region 59 of the vehicle battery pack container 60 to ambient atmosphere. The venting device 110 includes a housing 130 and a ball 132 disposed within the housing. In one exemplary embodiment, the housing 130 and the ball 132 are constructed of plastic. In an alternative embodiment, the housing 130 and the ball 132 are constructed of rubber. In other alternative embodiments, the housing 130 and the ball 132 could be constructed of other materials known to those skilled in the art. Also, the housing 130 could be constructed of a material different than a material used to construct the ball 132.

The housing 130 has a tubular portion 150, an end portion 152, a ring-shaped tab portion 160, a sealing tab 170, and retaining tabs 180, 182, 184. The tubular portion 150 has a first end 200, a second end 202, an inner surface 210, and an outer surface 212. The tubular portion 150 is centered about a longitudinal axis 135.

The end portion 152 is disposed at a first end 200 of the tubular portion 150 and encloses the first end 200. The end portion 152 has a plurality of apertures 230 extending therethrough.

The ring-shaped tab portion 160 extends around the outer surface 212 of the tubular portion 150 at the second end 202 of the tubular portion 150 and further extends radially outwardly from the outer surface 212.

The sealing tab 170 extends around the inner surface 210 of the tubular portion 150 at the second end 202 of the tubular portion 150 and further extends radially inwardly from the inner surface 210.

Referring to FIGS. 2 and 4-6, the retaining tabs 180, 182, 184 extend generally longitudinally from the second end 202 of the tubular portion 150. In one exemplary embodiment, the retaining tabs 180, 182, 184 are disposed equidistant from one another around a periphery of the second end 202. The retaining tabs 180, 182, 184 are configured to be received through the aperture 112 of the base portion 90 of the vehicle battery pack container 60. The retaining tabs 180, 182, 184 are held against a first surface 240 of the base portion 90 and the ring-shaped tab portion 160 is held against a second surface 250 of the base portion 90.

Referring to FIGS. 4 and 5, the ball 132 is movably disposed within an interior region of the housing 130. The ball 132 has a diameter less than an inner diameter of the tubular portion 150 of the housing 130. The ball 132 is configured to move within the interior region 133 of the tubular portion 150 between at least a first operational position (shown in FIG. 4) and a second operational position (shown at FIG. 5). When water (or another fluid) flows through the apertures 230 into the interior of the housing 130, the ball 132 will rise due to a force of buoyancy imparted by the water on the ball 132 and the ball 132 will be seated and sealed firmly against the sealing tab 170 at the first operational position (shown in FIG. 4) to prevent water from passing through the venting device 110 into the vehicle battery pack container 60. As the water flows out of the housing 130 through the apertures 230, a force of gravity or an internal pressure within the vehicle battery pack container 60 will move the ball 132 away from the sealing tab 170 to a second or open operational position (shown in FIG. 5) to allow gases from inside the vehicle battery pack container 60 to flow through the venting device 110 to external atmosphere.

Referring to FIG. 2, the aperture 112 in the vehicle battery pack container 60 is aligned with an aperture 270 in the vehicle floor 20. As shown, the venting device 110 is coupled to the base portion 90 proximate to the aperture 270 and extends downwardly through the aperture 270 of the vehicle floor 20. Thus, the second end 202 of the tubular portion 150 is disposed in the region 72 defined by the vehicle frame member 70. An advantage of positioning the venting device 110 within the region 72 is that vehicle frame member 70 deflects external dirt, water, and other debris away from the venting device 110.

The vehicle battery pack container claimed herein provides a substantial advantage over other vehicle battery pack containers. In particular, the claimed vehicle battery pack container utilizes a venting device that has a technical effect of preventing water and other materials from entering the vehicle battery pack when the ball is at a first operational position, and vents gases from within the vehicle battery pack container to ambient atmosphere when the ball is at a second operational position.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A vehicle battery pack container, comprising:
    a base portion having an aperture extending therethrough;
    a peripheral wall coupled to the base portion,
    a cover coupled to the peripheral wall;
    a venting device having a plastic housing and a ball disposed within an interior region of the housing, the plastic housing configured to be coupled to the base portion such that the venting device is in fluid communication with the aperture in the base portion;
    the plastic housing having a tubular portion, an end portion, a ring-shaped tab portion, a sealing tab, and at least first and second retaining tabs, the tubular portion being centered about a longitudinal axis and having a first end and a second end;
    the end portion being disposed at the first end of the tubular portion and enclosing the first end, the end portion having a plurality of apertures extending therethrough that extend substantially parallel to the longitudinal axis;
    the first and second retaining tabs extending generally parallel to the longitudinal axis from the second end of the tubular portion, the first and second retaining tabs being received through the aperture of the base portion such that the first and second retaining tabs are held against a first surface of the vehicle battery pack container and the ring-shaped tab portion is held against a second surface of the vehicle battery pack container, an outer diameter of the ring-shaped tab portion being greater than a distance from an outer surface of the first retaining tab to an outer surface of the second retaining tab; and
    the ball being configured to move within the interior region of the plastic housing between a first operational position and a second operational position, the ball configured to seal against the sealing tab of the plastic housing at the first operational position to prevent fluids from passing through the venting device into an interior region of the vehicle battery pack container, the ball further configured to allow gases from the interior region of the vehicle battery pack container to flow through the venting device when the ball is at the second operational position.

2. The vehicle battery pack container of claim 1, wherein the ring-shaped tab portion extends around an outer surface of the tubular portion at the second end of the tubular portion and further extends radially outwardly from the outer surface.

3. The vehicle battery pack container of claim 2, wherein the sealing tab extends around an inner surface of the tubular portion at the second end of the tubular portion and further extends radially inwardly from the inner surface.

4. The vehicle battery pack container of claim 1, wherein the ball is configured to move within the interior region of the tubular portion between the first operational position and the second operational position.

5. The vehicle battery pack container of claim 1, wherein the ball is constructed of at least one of plastic and rubber.

6. The vehicle battery pack container of claim 1, wherein the ball has a diameter less than an inner diameter of the plastic housing.

7. The vehicle battery pack container of claim 1, wherein the venting device is disposed within a region at least partially enclosed by a vehicle frame member.

8. The vehicle battery pack container of claim 1, wherein an outer diameter of the tubular portion at the first end is substantially equal to an outer diameter of the tubular portion at the second end.

9. A vehicle battery pack container, comprising:
    a base portion having an aperture extending therethrough;
    a peripheral wall coupled to the base portion,
    a cover coupled to the peripheral wall;
    a venting device having a housing and a ball disposed within an interior region of the housing, the housing configured to be coupled to the base portion such that the venting device is in fluid communication with the aperture in the base portion;
    the housing having a tubular portion, a substantially arcuate-shaped end portion, a ring-shaped tab portion, a sealing tab, and at least first and second retaining tabs, the tubular portion being centered about a longitudinal axis and having a first end and a second end, an outer diameter of the tubular portion at the first end being substantially equal to an outer diameter of the tubular portion at the second end, an inner diameter of the tubular portion being a substantially uniform diameter from the substantially arcuate-shaped end portion to the sealing tab;
    the substantially arcuate-shaped end portion being disposed at the first end of the tubular portion and enclosing the first end, the substantially arcuate-shaped end portion having a plurality of apertures extending therethrough that extend substantially parallel to the longitudinal axis;

the first and second retaining tabs extending generally parallel to the longitudinal axis from the second end of the tubular portion, the first and second retaining tabs being received through the aperture of the base portion such that the first and second retaining tabs are held against a first surface of the vehicle battery pack container and the ring-shaped tab portion is held against a second surface of the vehicle battery pack container, an outer diameter of the ring-shaped tab portion being greater than a distance from an outer surface of the first retaining tab to an outer surface of the second retaining tab; and the ball being configured to move within the interior region of the housing between a first operational position and a second operational position, the ball configured to seal against the sealing tab of the housing at the first operational position to prevent fluids from passing through the venting device into an interior region of the vehicle battery pack container, the ball further configured to allow gases from the interior region of the vehicle battery pack container to flow through the venting device when the ball is at the second operational position.

\* \* \* \* \*